(12) United States Patent
Gilson et al.

(10) Patent No.: US 8,820,088 B2
(45) Date of Patent: Sep. 2, 2014

(54) VARIABLE AREA FAN NOZZLE WITH ACOUSTIC SYSTEM FOR A GAS TURBINE ENGINE

(75) Inventors: Jonathan Gilson, West Hartford, CT (US); Andre M. Hall, East Hartford, CT (US); Oliver V. Atassi, Londmeadow, MA (US); Ramons A. Reba, South Windsor, CT (US)

(73) Assignee: United Technologies Corporation, Hartford, CT (US)

( * ) Notice: Subject to any disclaimer, the term of this patent is extended or adjusted under 35 U.S.C. 154(b) by 1071 days.

(21) Appl. No.: 12/804,666

(22) Filed: Jul. 27, 2010

(65) Prior Publication Data

US 2012/0023901 A1 Feb. 2, 2012

(51) Int. Cl.
*F02C 7/045* (2006.01)
*F02K 1/34* (2006.01)

(52) U.S. Cl.
USPC ............. 60/771; 181/215; 181/216; 181/222; 60/770; 60/226.3

(58) Field of Classification Search
USPC ......... 60/770, 771, 226.3, 204; 181/215, 213, 181/216, 222; 239/265.19, 265.25, 265.33, 239/265.13; 244/110 B
See application file for complete search history.

(56) References Cited

U.S. PATENT DOCUMENTS

| | | | | |
|---|---|---|---|---|
| 3,542,152 A | * | 11/1970 | Oxx, Jr. et al. | 181/214 |
| 3,598,318 A | * | 8/1971 | Schiel | 239/265.13 |
| 3,820,719 A | * | 6/1974 | Clark | 239/265.31 |
| 4,122,672 A | * | 10/1978 | Lowrie | 60/226.1 |
| 4,235,303 A | * | 11/1980 | Dhoore et al. | 181/214 |
| 5,060,471 A | * | 10/1991 | Torkelson | 60/262 |
| 5,806,302 A | * | 9/1998 | Cariola et al. | 60/204 |
| 5,927,647 A | * | 7/1999 | Masters et al. | 244/110 B |
| 5,975,237 A | * | 11/1999 | Welch et al. | 181/290 |
| 2008/0271431 A1 | * | 11/2008 | Porte | 60/226.1 |
| 2008/0295518 A1 | * | 12/2008 | Reba et al. | 60/725 |
| 2009/0053058 A1 | * | 2/2009 | Kohlenberg et al. | 415/227 |
| 2009/0320488 A1 | * | 12/2009 | Gilson et al. | 60/771 |

\* cited by examiner

*Primary Examiner* — William H Rodriguez
*Assistant Examiner* — Carlos A Rivera
(74) *Attorney, Agent, or Firm* — Carlson, Gaskey & Olds, P.C.

(57) ABSTRACT

A high-bypass gas turbine engine includes a variable area fan nozzle with an acoustic system having an acoustic impedance.

20 Claims, 7 Drawing Sheets

VARIABLE AREA FAN NOZZLE WITH ACOUSTIC SYSTEM FOR A GAS TURBINE ENGINE

CROSS REFERENCE TO RELATED APPLICATIONS

Reference is made to co-pending commonly-assigned, U.S. patent application Pub. No.: US 2009/0320488, entitled "GAS TURBINE ENGINE WITH NOISE ATTENUATING VARIABLE AREA FAN NOZZLE," and co-pending commonly-assigned, U.S. patent application (application Ser. No. 12/838,620, entitled "GAS TURBINE ENGINE WITH NOISE ATTENUATING VARIABLE AREA FAN NOZZLE"

BACKGROUND OF THE INVENTION

The present invention relates to a gas turbine engine, and particularly to a bypass turbofan engine nacelle assembly, and more particularly to a bypass turbofan engine nacelle assembly having a ported variable area fan nozzle (VAFN) with an acoustic system to reduce the total effective perceived noise level (EPNL).

Gas turbine engines which have an engine cycle modulated with a VAFN typically provide a smaller fan exit nozzle area during cruise conditions and a larger fan exit nozzle area during take-off and landing conditions.

The ported VAFN system may generate significant noise as upstream turbulence interacts with the leading edge of the VAFN. The upstream turbulence may result from turbulent boundary layers which expand from the upstream fixed nacelle wall, turbulence which evolves from the upstream fan exit guide vane (FEGV) wakes or endwall effects, and flow separation that may occur from the contour of the upstream nacelle wall. The physical mechanism for leading edge VAFN noise, which exhibits acoustic dipole behavior, is fundamentally different from traditional jet exhaust mixing noise, which exhibits acoustic quadrupole behavior. Additionally, this excess noise is not significantly reduced in forward flight as typical jet exhaust mixing noise. Thus, VAFN noise contributes toward the total effective perceived noise level. Accordingly, it is desirable to reduce VAFN noise.

SUMMARY OF THE INVENTION

A nacelle assembly for a bypass gas turbine engine according to an exemplary aspect includes: a ported variable area fan nozzle having a first fan nacelle section and a second fan nacelle section. The second fan nacelle section is axially movable relative the first fan nacelle section to define an auxiliary port to vary a fan nozzle exit area and adjust fan bypass airflow, the first fan nacelle section comprises a first acoustic system which provides acoustic impedance.

A nacelle assembly for a bypass gas turbine engine according to another exemplary aspect includes: a ported variable area fan nozzle having a first fan nacelle section and a second fan nacelle section. The second fan nacelle section is axially movable relative the first fan nacelle section to define an auxiliary port to vary a fan nozzle exit area and adjust fan bypass airflow, the first fan nacelle section comprises a first acoustic system which provides acoustic impedance, and the second fan nacelle section comprises a second acoustic system which provides acoustic impedance.

A method of reducing a total effective perceived noise level of a bypass gas turbine engine with a variable area fan nozzle according to an exemplary aspect includes a trailing edge region of the first fan nacelle section with a first acoustic system having acoustic impedance.

A method of reducing a total effective perceived noise level of a bypass gas turbine engine with a variable area fan nozzle according to an exemplary aspect includes a trailing edge region of the first fan nacelle section with a first acoustic system having an acoustic impedance, and a leading edge region of the second fan nacelle section with a second acoustic system having acoustic impedance.

BRIEF DESCRIPTION OF THE DRAWINGS

The various features and advantages of this invention will become apparent to those skilled in the art from the following detailed description of the currently preferred embodiments. The drawings that accompany the detailed description can be briefly described as follows.

DETAILED DESCRIPTION OF THE PREFERRED EMBODIMENT

Figure 1:
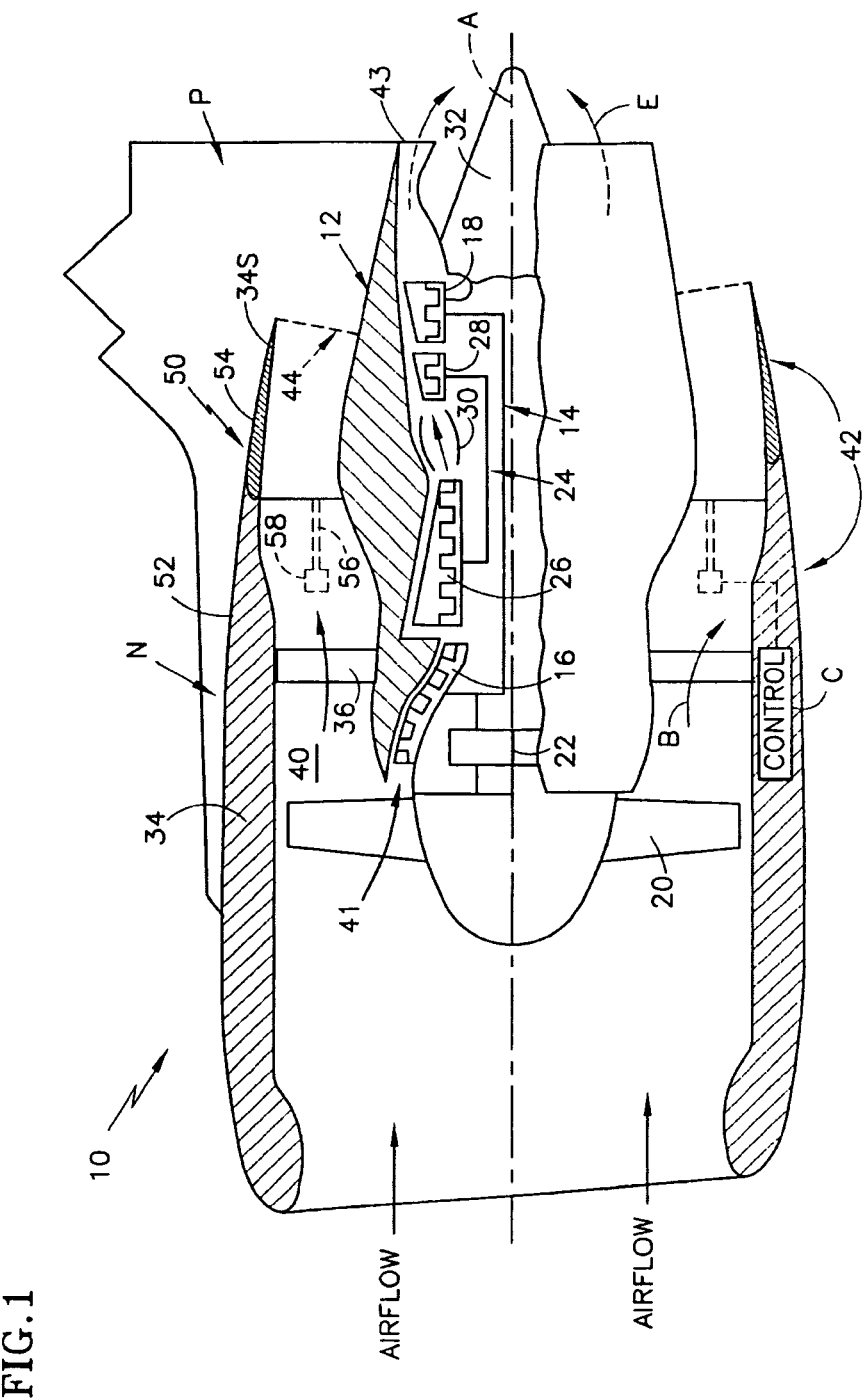
FIG. 1 is a general schematic partial fragmentary view of an exemplary gas turbine engine embodiment for use with the present invention.

FIG. 1 illustrates a general partial fragmentary schematic view of a gas turbofan engine 10, which is circumferentially disposed about an engine axis of rotation A, suspended from an engine pylon P within an engine nacelle assembly N.

The turbofan engine 10 includes a core engine within a core nacelle 12 that houses a low spool 14 and high spool 24. The low spool 14 includes a low pressure compressor 16 and low pressure turbine 18. The low spool 14 also drives a fan section 20 directly or through a gear train 22. The high spool 24 includes a high pressure compressor 26 and high pressure turbine 28. A combustor 30 is arranged between the high pressure compressor 26 and high pressure turbine 28. The low and high spools 14, 24 rotate about an engine axis of rotation A.

Airflow enters a fan nacelle 34, which at least partially surrounds the core nacelle 12. The fan section 20 communicates airflow into the core nacelle 12, one portion of the air (referred to as bypass airflow, hereinafter) flows through the bypass flow path 40, and the other portion of air (referred to as core airflow, hereinafter) flows through the core flow path 41. Core airflow compressed by the low pressure compressor 16 and the high pressure compressor 26 is mixed with the fuel and burned in the combustor 30 and expanded over the high pressure turbine 28 and low pressure turbine 18 sequentially. The turbines 28, 18 are coupled for rotation with, respective, spools 24, 14 to rotationally drive the compressors 26, 16 and through the gear train 22, the fan section 20 in response to the expansion. A core engine exhaust E exits the core nacelle 12 through a core nozzle 43 defined between the core nacelle 12 and a tail cone 32.

The core nacelle 12 is supported within the fan nacelle 34 by circumferentially space structures 36 often generically referred to as Fan Exit Guide Vanes (FEGV). The bypass flow path 40 is defined between the core nacelle 12 and the fan nacelle 34. The engine 10 generates a bypass flow arrangement with a bypass ratio in which substantial percent of the airflow which enters the fan nacelle 34 becomes bypass flow B. The bypass flow B communicates through the generally annular bypass flow path 40 and is discharged from the engine 10 through a ported variable area fan nozzle 42 which defines a nozzle exit area 44 between the fan nacelle 34 and the core nacelle 12 at a fan nacelle end segment 34S of the fan nacelle 34 downstream of the fan section 20.

The ported VAFN 42 (referred to as VAFN, hereinafter) operates to effectively vary the area of the fan nozzle exit area 44 to selectively adjust the pressure ratio of the bypass flow B in response to a controller C. Low fan pressure ratio turbofans are desirable for their high propulsive efficiency. However, low fan pressure ratio fans may be relatively susceptible to fan stability/flutter problems at low power and low flight speeds. The VAFN allows the engine to change to a more favorable fan operating line at low power, avoiding any instability region, and still provide the relatively smaller nozzle area necessary to obtain a high-efficiency fan operating line at cruise.

A significant amount of thrust is provided by the bypass flow B. The fan section 20 of the engine 10 is preferably designed for a particular flight condition—for example cruise at about 0.8 Mach number and 35,000 feet. As the fan blades within the fan section 20 are typically (but not necessarily) fixed and designed at a particular stagger angle for an efficient cruise condition, the VAFN 42 may be operated to effectively vary the fan nozzle exit area 44 to adjust fan bypass air flow such that the angle of attack or incidence on the fan blades is maintained close to the design incidence for efficient engine operation at other flight conditions, such as landing and take-off to thus provide optimized engine operation over a range of flight conditions with respect to performance and other performance parameters such as noise levels.

FIG. 1 shows a two-spool, geared architecture turbofan engine 10, it is understood, however, that the disclosure is applicable to any gas turbine engine having a ported variable area fan nozzle. Those gas turbine engine architectures include, but not limited to, three-spool, two-spool or single-spool, geared architecture or direct drive turbofan gas turbine engines.

Figure 2:
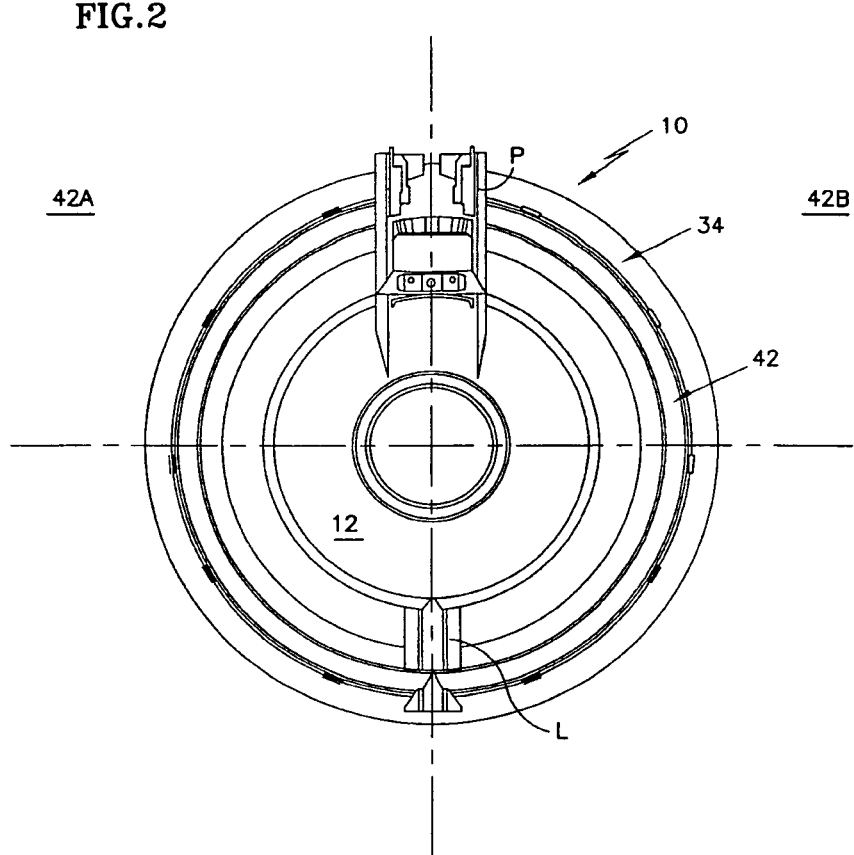
FIG. 2 is a rear view of the engine.

The VAFN 42, in one exemplary embodiment, can be extended circumferentially over 360° about the engine axis of rotation A; and in another exemplary embodiment, may be separated into at least two sectors 42A-42B (FIG. 2) defined between the pylon P and a lower Bi-Fi splitter L. It should be understood that although two segments are illustrated, any number of sectors and segments may alternatively or additionally be provided.

Figure 3A:
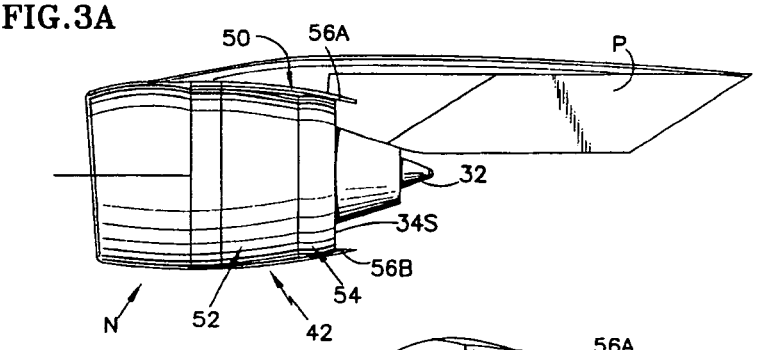
FIG. 3A is a side view of the engine integrated with a pylon.
Figure 3B:
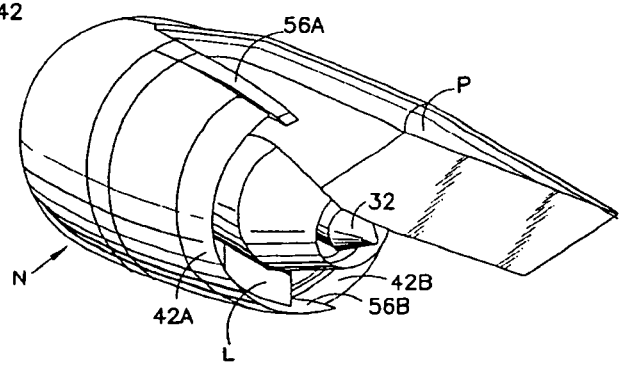
FIG. 3B is a rear perspective view of the engine integrated with a pylon.

The VAFN 42 generally includes an auxiliary port system 50 having a first fan nacelle section 52 and a second fan nacelle section 54 movably mounted relative the first fan nacelle section 52. The second fan nacelle section 54 axially slides along the engine axis A relative the fixed first fan nacelle section 52 to change the effective area of the fan nozzle exit area 44. The second fan nacelle section 54, in one non-limiting embodiment, slides aftward upon a track fairing 56A, 56B (illustrated schematically in FIGS. 3A and 3B) in response to an actuator 58 (illustrated schematically in FIG. 1). The track fairing 56A, 56B extends from the first fan nacelle section 52 adjacent the respective pylon P and the lower Bi-Fi splitter L (FIG. 3B).

Figure 4A:
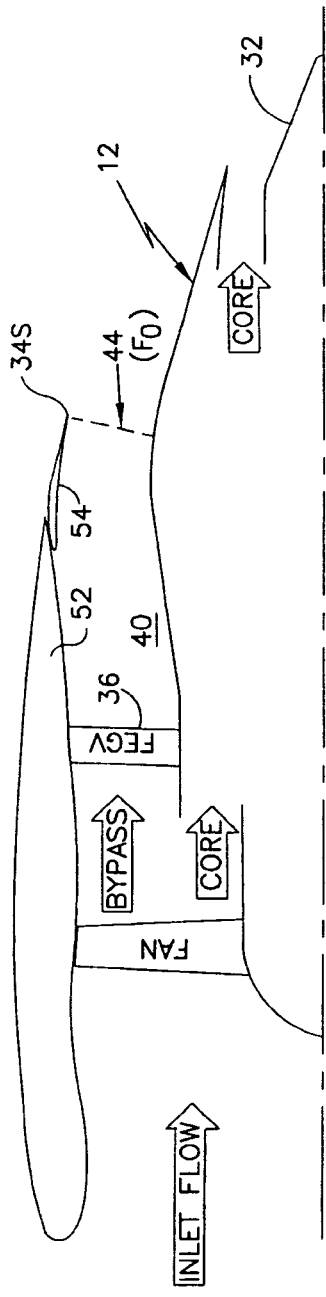
FIG. 4A is a sectional side view of the ported VAFN in a closed position.
Figure 4B:
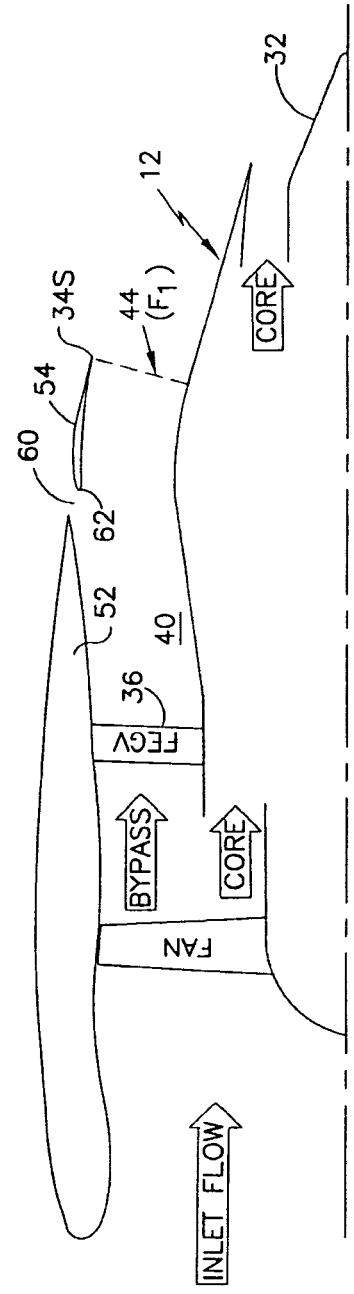
FIG. 4B is a sectional side view of the ported VAFN in an open position.

The VAFN 42 changes the physical area and geometry of the bypass flow path 40 during particular flight conditions. The bypass flow B is effectively altered by sliding of the second fan nacelle section 54 relative the first fan nacelle section 52 between a closed position (FIG. 4A) and an open position (FIG. 4B). The auxiliary port system 50 is closed by positioning the second fan nacelle section 54 in-line with the first fan nacelle section 52 to define the fan nozzle exit area 44 as exit area F0 (FIG. 4A). The VAFN 42 is opened by moving the second fan nacelle section 54 aftward along the track fairing 56A, 56B away from the first fan nacelle section 52 to open the auxiliary port 60 (FIG. 4B) which extends between the second fan nacelle section 54 relative the first fan nacelle section 52, and provide an increased fan nozzle exit area 44 exit area F1. That is, the exit area F1 with the auxiliary port 60 (FIG. 4B) is greater than exit area F0 (FIG. 4A), thanks to the cone-shaped core nacelle 12.

In one non-limiting embodiment, the auxiliary port 60 is incorporated within the bypass flow path 40 aft of the Fan Exit Guide Vanes 36 (FEGVs). The auxiliary port 60 is located through the bypass duct outer wall.

In operation, the VAFN 42 communicates with the controller C to move the second fan nacelle section 54 relative the first fan nacelle section 52 of the auxiliary port system 50 to effectively vary the area defined by the fan nozzle exit area 44. Various control systems including an engine controller or an aircraft flight control system may also be usable with the present invention. By adjusting the axial position of the entire periphery of the second fan nacelle section 54 in which all sectors are moved simultaneously, engine thrust and fuel economy are optimized during each flight regime by varying the fan nozzle exit area.

The VAFN may generate significant noise as upstream airflow turbulence interacts with the leading edge 62e of the second fan nacelle section 54. To reduce the VAFN noise, referring to FIG. 5, the first fan nacelle section 52 includes a trailing edge region 140 having a first acoustic system 142. The acoustic system 142 utilizes the available volume of the trailing edge region 140 to achieve optimal acoustic impedance. The physical size and location for the trailing edge region 140 depend on the specific VAFN configuration. A rule of thumb for the size of the trailing edge region 140 is that it should extend upstream direction from the trailing edge 140e of the first fan nacelle section 52 to the point where the leading edge 62e of the second fan nacelle section 54 makes contact with the first fan nacelle section 52 when the second fan nacelle section 54 is positioned at closed position. With acoustic impedance, the acoustic system 142 operates to attenuate the leading edge region 62 noise. As a result, far field total effective perceived noise level is reduced. Since the acoustic system 142 is naturally placed in close proximity to the VAFN noise source at the VAFN leading edge, optimal noise reduction is achieved.

Figure 6A:
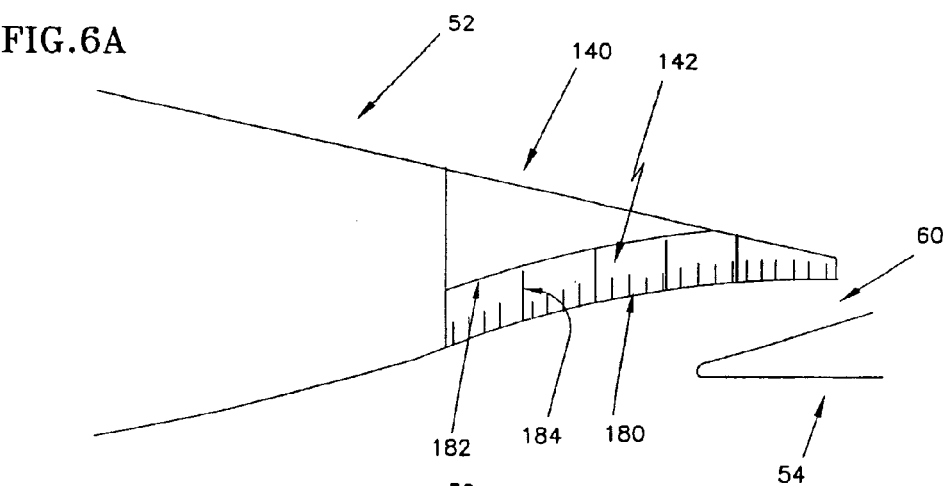
FIG. 6A is a sectional side view of the acoustic system.

Referring to FIG. 6A, the acoustic system 142 includes a perforated sheet 180, a backing plate 182 and internal partitions 184. The perforated sheet 180 covers inner surface of the trailing edge region 140; the backing plate 182 defines characteristic depth associated with acoustic frequency tuning; and the internal partitions 184 act to ensure locally reacting characteristics of the acoustic treatment. That is, the acoustic system 142 is made to be locally reacting when it contains internal partitions 184 which subdivide the inner volume of the acoustic system 142. The internal partitions 184 which are substantially perpendicular to the perforated sheet 180 enables the acoustic waves to see a cavity depth that is equivalent to the distance between the perforated sheet 180 and the backing plate 182. The porosity of the perforated sheet 180, the placement of the internal partitions 184 and the backing plate 182 are designed to tune the acoustic system to achieve maximum acoustic attenuation. It should be understood that the internal partition 184 and the backing plate 182 are illustrated in partial schematic cross-section and that various arrangements of the structures may be provided to support the perforated sheet 180. For example, in addition to the internal partitions 184 being placed in the region of the cross section shown in FIG. 6A, the partitions may also be placed circumferentially. The pore shape, size and spacing between pores of the perforated sheet 180 could be varied to achieve optimal acoustic impedance. One of ordinary skill in the art will be able to readily determine the specific shape, size, spacing and various arrangements of the structures of the example embodiment of the present invention.

Figure 6B:
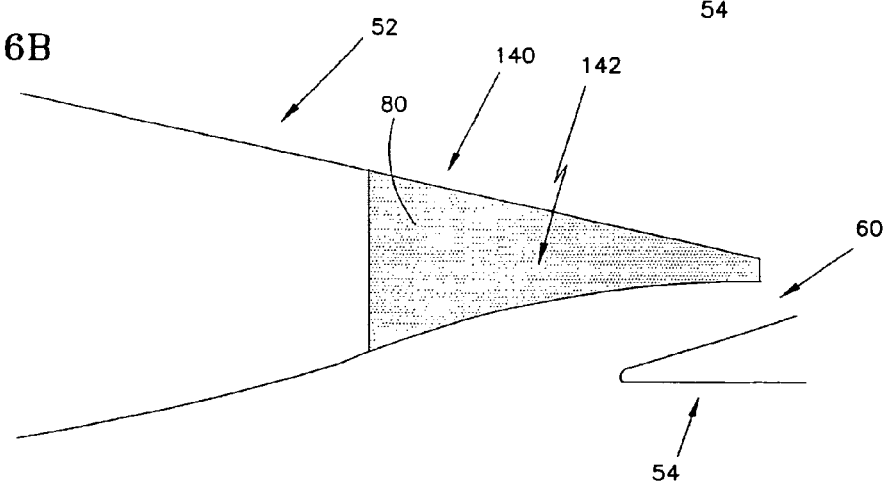
FIG. 6B is a sectional side view of the acoustic system.

Referring to FIG. 6B, the acoustic system 142 includes a bulk acoustic absorbing material 80 such as, for example only, a sintered metal, a ceramic foam, aramid fibers under the trade name KEVLAR (a registered trademark of E.I DuPont de Nemours & Company), a composite or a carbide material, to minimize effects on the steady flow through the auxiliary port 60 and maximize effects on unsteady acoustic loading. As with the embodiment illustrated in FIG. 6A, the porosity, and material characteristics of the bulk absorbing material 80 are selected for optimal acoustic impedance and thus optimal acoustic attenuation. FIG. 6B shows a completely acoustic absorbing-material filled volume in the trailing edge region 140; while FIG. 6C delineates an acoustic system 142 having a bulk cartridge 146 stuffed with acoustic absorbing material in the trailing edge region 140. The inner surface 144 of the bulk cartridge 146 can be made from a perforated sheet or perforated elastomeric face plate. The acoustic absorbing material illustrated in both FIGS. 6B and 6C can also be deformable material such as, for example only, elastomeric material with mechanical properties selected to provide sound attenuation. The deformable acoustic system can be spanned larger or smaller along the inner surface 144 of the trailing edge region 140. Additional benefit of the elastomeric material for the acoustic system is that it deforms when the VAFN is positioned in the closed position, thus serving the function of sealing the gap between the first fan nacelle section 52 and the second fan nacelle section 54 that may exist otherwise, and preventing air flow leakage through the gap. Air flow leakage through the gap may compromise gas turbine engine propulsion efficiency and operability when the VAFN is positioned in the closed position.

Figure 7:
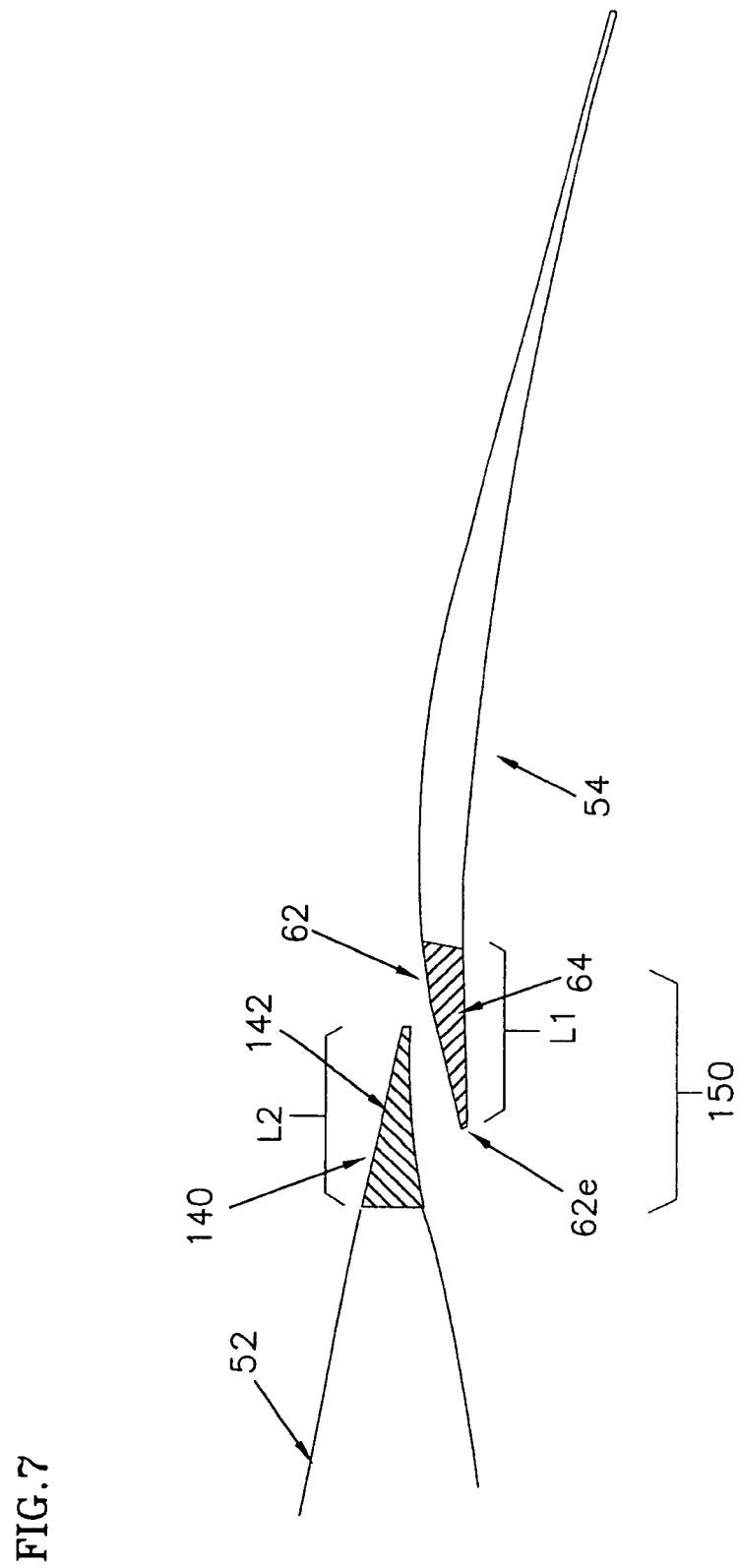
FIG. 7 is a schematic sectional side view of the ported VAFN with a tandem acoustic system.

Referring to FIG. 7, the acoustic impedance feature includes a combination of a trailing edge region 140 with a first acoustic system 142, and a leading edge region 62 with a second acoustic system 64. (Hereinafter the combined acoustic impedance feature of the two acoustic systems 142 and 64 is referred to as a tandem acoustic system 150.) In the tandem acoustic system 150, the second acoustic system 64 of the leading edge region 62 is in close proximity to the trailing edge region 140. As the acoustic noise source results from turbulent boundary layers along the trailing edge, and/or any other turbulence generation mechanisms along the trailing edge impinging on the leading edge 62e of the second fan nacelle section 54, the second acoustic system 64 of the leading edge region 62 operates to minimize the acoustic source radiation from the leading edge region 62 and/or attenuate the leading edge noise, the first acoustic system 142 operates to further attenuate the noise from the leading edge region 62 noise. The tandem acoustic system 150 is designed with specific physical properties to capture additional noise attenuation, that is, the tandem system 150 is better than the sum of the individual acoustic system 142 and 64.

The physical size of the leading edge region 62 may extend in the downstream direction from the leading edge 62e by roughly the same axial distance as the trailing edge region 140 extends upstream direction. Or simply put, axial length L1 of the leading edge region 62 and axial length L2 of the trailing edge region 140 should be substantially equal, with a length of one quarter (¼) to one third (⅓) of the second fan nacelle section 54. The shape of the leading edge 62e can also further impact noise attenuation. Co-pending commonly-assigned, U.S. patent application (application Ser. No. 12/838,620, entitled "GAS TURBINE ENGINE WITH NOISE ATTENUATING VARIABLE AREA FAN NOZZLE" discloses optimal shapes of the leading edge 62e for noise attenuation.

Figure 5:
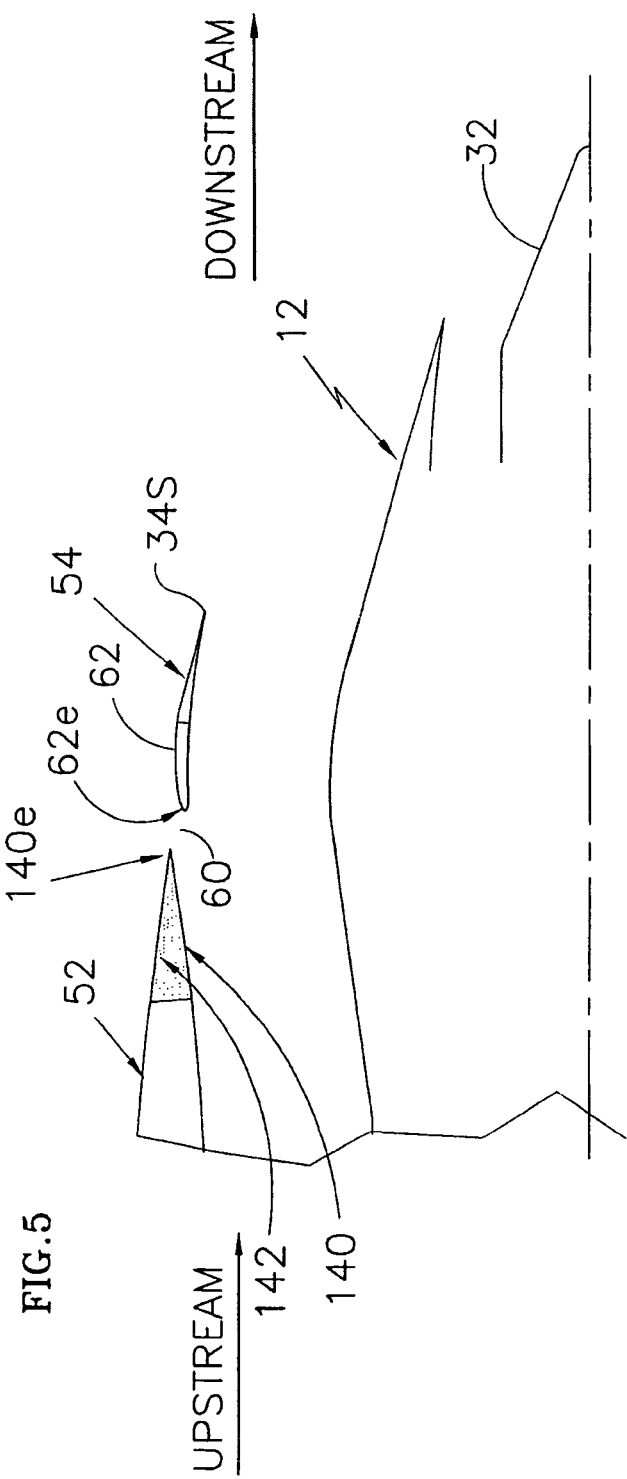
FIG. 5 is a sectional side view of the ported VAFN with an acoustic system.

The second acoustic system 64 of the leading edge region 62 is disclosed in the commonly-assigned, U.S. patent application Pub. No. US 2009/0320488, entitled "GAS TURBINE ENGINE WITH NOISE ATTENUATING VARIABLE AREA FAN NOZZLE," The entire disclosure of the prior application is hereby incorporated by reference herein in its entirety. The acoustic system 64 of the leading edge region 62 of the tandem acoustic system 150 can be, but not limited to, any of the exemplary embodiments disclosed in U.S. patent application Pub. No. US 2009/0320488:

LE1—A perforated inner face sheet, a perforated outer face sheet supported by a structure as with its FIG. 4 embodiment;

LE2—A bulk absorbing material as with its FIG. 5 embodiment; and,

LE3—A forward acoustic system and an aft acoustic system as with its FIG. 6 embodiment.

Figure 8A:
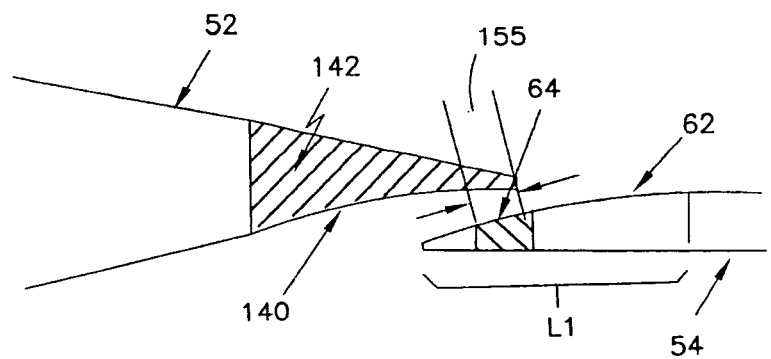
FIG. 8A is a sectional side view of the acoustic system.
Figure 8B:
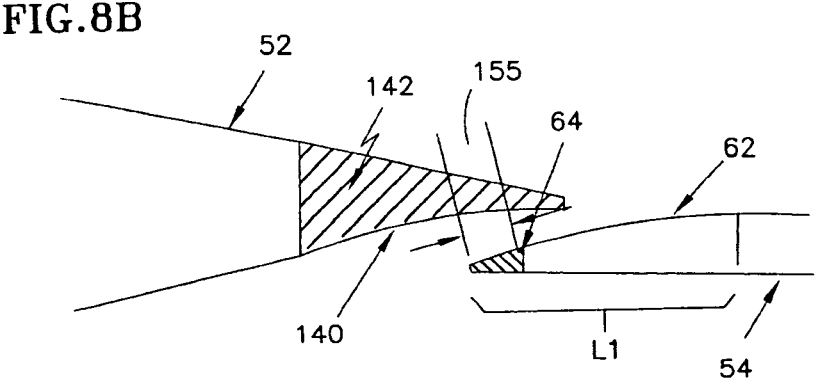
FIG. 8B is a sectional side view of the acoustic system.

For the tandem acoustic system 150, the second acoustic system 64 of the leading edge region 62 can also be:

LE4—The second acoustic system 64 may occupy only a portion of the leading edge region 62 of the second fan nacelle section 54. FIG. 8A, as an example, shows the second acoustic system 64 occupies only the middle portion of the leading edge region 62. As yet another example, FIG. 8B shows the acoustic system occupies the forward portion of the leading edge region 62. It is understood that the second acoustic system 64 occupies only a portion of the leading edge region 62, and may be either one or combination of acoustic designs denoted by LE1, LE2 or LE3. It is preferred that the second acoustic system 64 of the leading edge region 62 is placed in close proximity to the trailing edge region 140 of the first fan nacelle section 52 so that a region of opposed acoustic treatment 155 is realized.

Figure 6C:
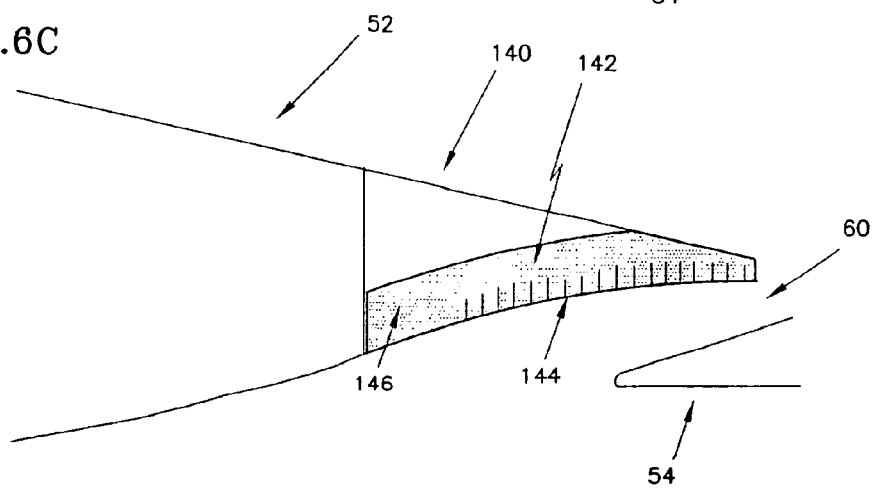
FIG. 6C is a sectional side view of the acoustic system.

The acoustic system 142 of the trailing edge region 140 of the tandem acoustic system 150 can be, but is not limited to, any one of the exemplary embodiments listed below:

TE1—A perforated sheet, a backing plate and internal partitions design as with FIG. 6A disclosed above;

TE2—A bulk acoustic absorbing material design as with FIG. 6B disclosed above; and, TE3—A bulk cartridge stuffed with acoustic absorbing material design as with FIG. 6C disclosed above.

Figure 8C:
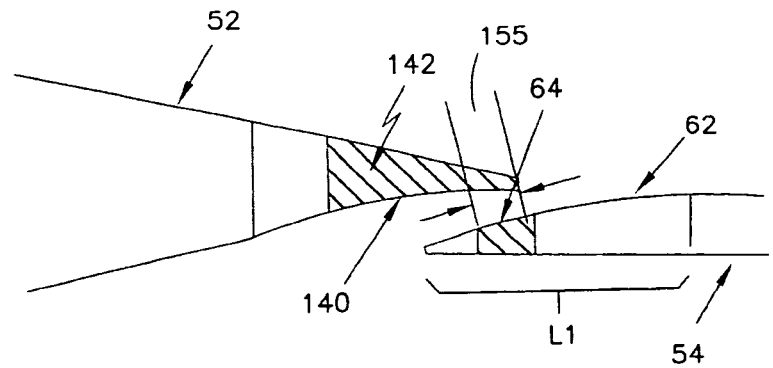
FIG. 8C is a sectional side view of the acoustic system

As with the second acoustic system 64 of the leading edge region 62, the first acoustic system 142 may occupy only a portion of the trailing edge region 140. It is preferred that the first acoustic system 142 of the trailing edge region 140 exists in close proximity to the leading edge region 62 of the second fan nacelle section 54 to accommodate the required VAFN schedule, so that a region of opposed acoustic treatment 155 may be realized as exemplarily shown in FIG. 8C.

Noise reduction on the order of approximately 3 EPNdB or greater cumulative over the certification conditions described in Federal Acquisition Regulation (FAR) 36 may be readily achieved by the acoustic system disclosed herein and include both tone and broadband reductions.

The foregoing description is exemplary rather than defined by the limitations within. Many modifications and variations are possible in light of the above teachings. The preferred embodiments have been disclosed, however, one of ordinary skill in the art would recognize that certain modifications would come within the scope of this invention. It is, therefore, to be understood that within the scope of the appended claims, the invention may be practiced otherwise than as specifically described.

What is claimed is:

1. A nacelle assembly for a gas turbine engine comprising:
   a core nacelle defined about an engine centerline axis;
   a fan nacelle mounted at least partially around said core nacelle, the core nacelle and fan nacelle defining a fan bypass flow path; and
   a variable area fan nozzle in communication with said fan bypass flow path, said variable area fan nozzle having a first fan nacelle section and a second fan nacelle section downstream of said first fan nacelle section, said first fan nacelle section and said second fan nacelle section axially movable relative to one another to define an auxiliary port to vary a fan nozzle exit area and adjust fan bypass airflow, said auxiliary port defined between said first fan nacelle section and said second fan nacelle section, said first fan nacelle section comprises a first acoustic system comprising a first acoustic absorbing-material having a first acoustic impedance configured to attenuate a noise characterized by a leading edge of said second fan nacelle section, said first acoustic system disposed at a trailing edge of said first fan nacelle section, said second fan nacelle section comprises a second acoustic system comprising a second absorbing-material having a second acoustic impedance, said first acoustic system extends axially a first length along said first fan nacelle section and said second acoustic system extends axially a second length along said second fan nacelle section, said first length and said second length being substantially equal to each other.

2. The assembly as recited in claim 1, wherein said first acoustic system comprises a perforated sheet.

3. The assembly as recited in claim 2, wherein said perforated sheet further comprises a deformable material.

4. The assembly as recited in claim 1, wherein said first acoustic system comprises a perforated sheet, a backing plate and internal partitions.

5. The assembly as recited in claim 1, wherein said first acoustic system comprises a bulk acoustic absorbing material.

6. The assembly as recited in claim 1, wherein said first acoustic system comprises a bulk cartridge.

7. The assembly as recited in claim 6, wherein said bulk cartridge comprises a bulk acoustic absorbing material.

8. The assembly as recited in claim 5 or 7, wherein said bulk absorbing material is selected from a group consisting of sintered metal, ceramic foam, aramid fiber, carbide material and composite.

9. The assembly as recited in claim 5 or 7, wherein said bulk absorbing material comprises a deformable material.

10. The assembly as recited in claim 1, wherein said second acoustic system is defined at least in part within a leading edge region of said second fan nacelle section.

11. The assembly as recited in claim 1, wherein said first acoustic system and the said second acoustic system are placed in close proximity to form a region of opposed acoustic treatment along said auxiliary port.

12. The assembly as recited in claim 1, wherein said second fan nacelle section is subdivided into a multiple of independently operable sectors, each of said multiple of independently operable sectors axially movable relative said the first fan nacelle section to define an asymmetric fan nozzle exit area.

13. The assembly as recited in claim 1, wherein said first acoustic system is configured to extend between said trailing edge and a point defined on said first fan nacelle section at which a leading edge of said second fan nacelle section engages said first fan nacelle section when said variable area fan nozzle is located in a closed position.

14. The assembly as recited in claim 1, wherein said second acoustic system is spaced a distance from a leading edge of said second fan nacelle section.

15. The assembly as recited in claim 1, wherein said second fan nacelle section defines a third length between a leading edge and a trailing edge of said second fan nacelle section, said second length being a ratio of between 1:4 and 1:3 of said third length.

16. A bypass gas turbine engine comprising:
    a core engine defined about an axis;
    a core nacelle defined at least partially about said core engine;
    a fan nacelle mounted at least partially around said core nacelle to define a fan bypass flow path; and
    a variable area fan nozzle in communication with said fan bypass flow path, said variable area fan nozzle having a first fan nacelle section and a second fan nacelle section downstream of said first fan nacelle section, said first fan nacelle section and said second fan nacelle section axially movable relative to one another to define an auxiliary port to vary a fan nozzle exit area and adjust fan bypass airflow, said auxiliary port defined between said first fan nacelle section and said second fan nacelle section, said first fan nacelle section comprises a first acoustic system comprising a first absorbing-material which provides a first acoustic impedance configured to attenuate a noise characterized by a leading edge of said second fan nacelle section, said first acoustic system disposed at a trailing edge of said first fan nacelle section, said second fan nacelle section comprises a second acoustic system comprising a second absorbing-material which provides a second acoustic impedance, said first acoustic system extends axially a first length along said first fan nacelle section and said second acoustic system extends axially a second length along said second fan nacelle section, said first length and said second length being substantially equal to each other.

17. The engine as recited in claim 16, wherein said first acoustic system and the said second acoustic system are placed in close proximity to form a region of opposed acoustic treatment along said auxiliary port.

18. The engine as recited in claim 16, further comprising:
    a gear train driven by said core engine;
    a turbofan driven by said gear train about said axis.

19. A method of reducing a total effective perceived noise level of a gas turbine engine with a variable area fan nozzle comprising:

axially moving a second fan nacelle section between a closed position in which the second fan nacelle section is in sequential alignment with a first fan nacelle section in response to a cruise flight condition and an open positioning in which the second fan nacelle section is aftward of the first fan nacelle section to define an auxiliary port in response to a non-cruise flight condition, said auxiliary port defined between said first fan nacelle section and said second fan nacelle section, the first fan nacelle section having a trailing edge region with a first acoustic system comprising a first absorbing-material which provides an acoustic impedance configured to attenuate a noise characterized by a leading edge of said second fan nacelle section when the second fan nacelle section is positioned at a non-closed position, said second fan nacelle section having a second acoustic system comprising a second absorbing-material which provides a second acoustic impedance, said first acoustic system extends axially a first length along said first fan nacelle section and said second acoustic system extends axially a second length along said second fan nacelle section, said first length and said second length being substantially equal to each other.

20. A method as recited in claim 19, further comprising: placing said first acoustic system and the said second acoustic system in close proximity to form a region of opposed acoustic treatment along said auxiliary port.

\* \* \* \* \*